(12) United States Patent  (10) Patent No.: US 7,555,310 B2
Sakuramoto et al. (45) Date of Patent: Jun. 30, 2009

(54) ELECTRONIC APPARATUS AND COMPUTER READABLE MEDIUM RECORDED VOICE OPERATING PROGRAM

(75) Inventors: Kentarou Sakuramoto, Osaka (JP); Hideki Hayashi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 435 days.

(21) Appl. No.: 11/557,979

(22) Filed: Nov. 9, 2006

(65) Prior Publication Data

US 2007/0150289 A1    Jun. 28, 2007

(30) Foreign Application Priority Data

Dec. 21, 2005    (JP)    ............................. 2005-368818
Dec. 21, 2005    (JP)    ............................. 2005-368819

(51) Int. Cl.
   *H04M 1/00*    (2006.01)
(52) U.S. Cl. .................. 455/550.1; 455/411; 455/556.1; 704/208; 713/182
(58) Field of Classification Search .............. 455/550.1, 455/411, 556.1; 713/182; 704/208
See application file for complete search history.

(56) References Cited

U.S. PATENT DOCUMENTS

| 2002/0022960 | A1* | 2/2002 | Charlesworth et al. | ....... 704/251 |
| 2002/0031139 | A1* | 3/2002 | Yoshizawa | ................... 370/419 |
| 2003/0120555 | A1* | 6/2003 | Kitagawa | ..................... 705/26 |
| 2003/0130016 | A1* | 7/2003 | Matsuura et al. | ............ 455/569 |
| 2004/0139052 | A1* | 7/2004 | Kazushige et al. | ............. 707/1 |
| 2005/0143979 | A1* | 6/2005 | Lee et al. | .................... 704/208 |
| 2005/0254070 | A1* | 11/2005 | Sayama | ....................... 358/1.1 |
| 2006/0068759 | A1* | 3/2006 | Ikebe et al. | .................. 455/411 |
| 2006/0098636 | A1* | 5/2006 | Iwami et al. | ................. 370/352 |
| 2006/0105795 | A1* | 5/2006 | Cermak et al. | .............. 455/518 |

FOREIGN PATENT DOCUMENTS

JP    2005-204974 A    8/2005

* cited by examiner

*Primary Examiner*—Danh C Le
(74) *Attorney, Agent, or Firm*—Global IP Counselors, LLP

(57) ABSTRACT

An electronic apparatus configured, on the assumption of its sharing by a plurality of users, to provide a plurality of functions, in which normal operations and interrupt operations based on a user's voice can be performed is provided. The apparatus comprises: a voice inputting unit for inputting a user's voice; a storing unit for storing at least a predetermined type of operation for each of a plurality of users; a voice decoding unit for decoding input voice information; a determining unit for determining if the decoded voice describes a type of operation or describes a type of operation and a word "interrupt"; a command outputting unit for outputting: a command which allows a processing involved in the type of operation to be executed, at least when the determining unit determines that the decoded voice describes a type of operation in the storing unit. Wherein, the command outputting outputs a command which makes the processing in execution suspended and allows a processing involved in the type of operation specified with the "interrupt" to be executed as a priority, when the determining unit determines that the decoded voice describes a type of operation in the storing unit and a word "interrupt" while the processing involved in a type of operation is executed. The command outputting unit outputs a command which allows the suspended processing to be resumed, after the processing specified by the "interrupt" is completed.

15 Claims, 15 Drawing Sheets

|  |  | User A | User B | User C | Guest |
|---|---|---|---|---|---|
| copy | Authorized Status | Authorized | Authorized | Unauthorized | Authorized |
|  | Setting | Density: High, Number of Sets to Print: 2 | Initial Setting |  | Initial Setting |
| Fax | Authorized Status | Authorized | Authorized | Authorized | Unauthorized |
|  | Setting | Initial Setting | Added Client Information: Company D, Company E | Added Client Information: Company F |  |
| Email | Authorized Status | Unauthorized | Authorized | Authorized | Unauthorized |
|  | Setting |  | Added Client Information: Company H, Company I | Initial Setting |  |
| Voiceprint Information |  | Registered | Registered | Registered | Registered |

Fig. 2

| User TABLE | | User A | User B | User C | Guest |
|---|---|---|---|---|---|
| List for Fax transmission per User (to be displayed on panel) | | 1: Company G | 1: Company D | 1: Company F | |
| | | | 2: Company E | 2: Company G | |
| | | | 3: Company G | | |
| List for Email sending per User (to be displayed on panel) | | | 1: Company H | 1: Company J | |
| | | | 2: Company I | 2: Company K | |
| | | | 3: Company J | | |
| | | | 4: Company K | | |

Fig. 4

Base TABLE

| registered contents | FAX | Email |
|---|---|---|
| FAX 1 | Company D | |
| FAX 2 | Company E | |
| FAX 3 | Company F | |
| FAX 4 | Company G | |
| Email 1 | | Company H |
| Email 2 | | Company I |
| Email 3 | | Company J |
| Email 4 | | Company K |

Fig. 5

ELECTRONIC APPARATUS AND COMPUTER READABLE MEDIUM RECORDED VOICE OPERATING PROGRAM

BACKGROUND OF THE INVENTION

1. Field of the Invention

The present invention relates to an electronic apparatus which executes a predetermined operation based on a user's voice, in particular, to an electronic apparatus such as an image forming apparatus which is configured on the assumption of its use by a plurality of users. The present invention also relates to an voice operating program for implementing such electronic apparatus.

Also the present invention relates to an electronic apparatus which executes a predetermined operation based on a user's voice, for example, to an electronic apparatus configured as a shared apparatus such as an ATM (automatic teller machine) for banks, FeliCa/Edy® terminal, a personal computer, and various appliances, which provides individual settings or grades for each user. The present invention also relates to an voice operating program for implementing such electronic apparatus.

2. Background Information

Conventional electronic apparatuses which perform predetermined operations based on a user's voice include a game machine, for example, which is suggested in Japanese Patent Application Laid-Open No. 2005-204974. In the game machine, voiceprint information is extracted from an input voice of a player through a microphone, before a game is started. After the game started, the player speaks an operation command, and the voiceprint from the operation command is compared to the above extracted voiceprint information. If there is a match between the two voiceprints, the operation command by the user can be acoustically recognized, which controls a driving of a rotating cylindrical roll of the game machine.

In the above patent document, although both the voiceprint of the user (player)'s voice and the voice of the operation command are recognized, every user is admitted to execute only one command. This system is not appropriate for a shared device which is configured on the assumption that it will be used by a plurality of users and has a plurality of functions including an interrupt processing function in order to enable normal operations and interrupt operations to be performed based on the users' voices.

Also in the above patent document, although both the voiceprint of the user (player)'s voice and the voice of the operation command are recognized, every user is admitted to execute only one command. This system cannot be applied to a shared device which is configured on the assumption of its sharing by a plurality of users, to have a plurality of functions and provide individual settings or grades for each user.

The present invention was made to solve such inconvenience, and one object of the present invention is to provide an electronic apparatus configured, on the assumption of its sharing by a plurality of users, to provide a plurality of functions, in which normal operations and interrupt operations based on the users' voices can be performed, and to provide a computer readable medium recorded a voice operating program for implementing such electronic apparatus.

Also the present invention was made to solve such inconvenience, and one object of the present invention is to provide an electronic apparatus configured, on the assumption of its sharing by a plurality of users, to provide a plurality of functions, which performs operations corresponding to individual settings or grades for each user, and to provide a computer readable medium recorded a voice operating program for implementing such electronic apparatus.

SUMMARY OF THE INVENTION

In order to achieve the object described above, in accordance with one aspect of the present invention, an electronic apparatus comprises a voice inputting unit, a storing unit, a voice decoding unit, a determining unit and a command outputting unit. The voice inputting unit inputs the user's voice. The storing unit stores at least a predetermined type of operation for each of a plurality of users. The voice decoding unit decodes voice information which is input through the voice inputting unit. The determining unit determines if the voice decoded by the voice decoding unit describes a type of operation stored in the storing unit or describes a type of operation stored in the storing unit and a word "interrupt". At least when the determining unit determines that the decoded voice describes a type of operation in the storing unit, the command outputting unit outputs a command for allowing a processing involved in the type of operation to be executed. Also, when the determining unit determines that the decoded voice describes a type of operation in the storing unit and a word "interrupt" while the processing involved in the type of operation is executed, the outputting unit outputs a command for suspending the processing which is being in execution and allowing a processing involved in the type of operation specified with the "interrupt" to be executed as a priority. Also, the command outputting unit outputs a command for allowing the suspended processing to be resumed after the processing specified with the "interrupt" is completed.

According to the configuration described above, when each of the plurality of users speaks a type of operation, a processing involved in the type of operation is performed in a condition corresponding to the user, and when the user speaks a word "interrupt" with a type of operation, the processing in execution is suspended to execute a processing involved in the type of operation specified with the "interrupt" as a priority, and the suspended processing will be resumed after the priority processing is completed. In this way, normal operations and interrupt operations based on a user's voice can be performed in the electronic apparatus which is configured, on the assumption of its sharing by a plurality of users, to provide a plurality of functions. According to the present invention, an electronic apparatus configured, on the assumption of its sharing by a plurality of users, to provide a plurality of functions, in which normal operations and interrupt operations based on a user's voice can be performed is provided.

It is preferable that the electronic apparatus further comprises a recognizing unit that recognizes the user based on the information of the voice which is input through the voice inputting unit. Further the storing unit stores an authorized status of each user to perform the type of operation. The voice decoding unit decodes the voice information when the recognizing unit recognizes the user. The determining unit determines if the user is authorized to perform the type of operation, when the determining unit determines that the decoded voice describes the type of operation or describes the type of operation and the word "interrupt". The command outputting unit outputs a command for allowing a processing involved in the type of operation to be executed, when the determining unit determines that the user is authorized to perform the type of operation.

According to the configuration described above, when each of the plurality of users, who is authorized to perform a type of operation, speaks the type of operation, the user is recognized, so that a processing involved in the type of operation can be performed in a condition corresponding to the user. This enables individual settings or grades for each user to be appropriately achieved in the electronic apparatus which is configured, on the assumption of its sharing by a plurality of users, to provide a plurality of functions.

It is preferable that the type of operation includes at least one selected from the group consisting of copy operation, facsimile transmission operation, and Email sending operation, and the storing unit stores setting information of a copy density and a number of sets to print when the type of operation is the copy operation, and stores setting information of destinations when the type of operation is the facsimile transmission operation and the Email sending operation.

According to the configuration described above, because the storing unit stores setting information of a copy density and a number of sets to print when the type of operation is the copy operation, and stores setting information of destinations when the type of operation is the facsimile transmission operation and the Email sending operation, no more setting is required to be input by a user to start the operations, and since all what each user needs to be aware of is his/her personal setting information, the user can use the electronic apparatus as his/her own.

It is preferable that the storing unit has a user table and a base table. The information of the destinations for facsimile transmission operation and Email sending operation is stored in the base table, and destination names which individually correspond to the destinations in the base table are stored in the user table with an individual number in the order of setting, for each of the users.

According to the configuration described above, the information of destinations is stored in the base table with a registered number for each destination, but each of the destination name is registered in the user table with another number in the order of setting independently of the registered number, for each user. This keeps the users unaware that there is some information with registered numbers in the base table which is inaccessible to them.

It is preferable that the electronic apparatus further comprises a displaying unit that displays the setting information, and a display controlling unit that controls a display on the displaying unit. The command outputting unit outputs a command to the display controlling unit to display the setting information on the displaying unit, when the determining unit determines that the user is authorized to perform the type of operation.

According to the configuration described above, a user can easily check his/her personal setting information displayed on the displaying unit.

It is preferable that the command outputting unit outputs a command to the display controlling unit to display the destination names stored in the user table on the displaying unit in the order of setting, when the determining unit determines that the user is authorized to perform the type of operation.

According to the configuration described above, a user can easily check his/her personal destination names displayed on the displaying unit in the order of setting.

It is preferable that when the determining unit determines that the decoded voice describes the type of operation and the word "interrupt" while the displaying unit displays the setting information, the command outputting unit temporarily makes the setting information displayed on the displaying unit stored in a memory table for interrupt, and outputs a command to the display controlling unit to clear the setting information displayed on the displaying unit, and after the processing involved in the interrupt type of operation is completed, the command outputting unit outputs a command to the display controlling unit to display the setting information stored in the memory table for interrupt on the displaying unit.

In accordance with another aspect of the present invention, a computer readable medium on which a voice operating program is recorded is provided. The voice operating program is configured to cause an electronic apparatus to execute processings comprising: a voice decoding processing, a determining processing and a command outputting processing. The voice decoding processing decodes information of a voice which is input through a voice inputting unit. The determining processing determines if the voice decoded by the voice decoding processing describes a type of operation which is registered and stored for each of a plurality of users in advance or the type of operation and a word "interrupt". At least when the determining processing determines that the decoded voice describes a type of operation registered in advance, the command outputting processing outputs a command for allowing a processing involved in the type of operation to be executed. Also, when the determining processing determines that the decoded voice describes a type of operation registered in advance and a word "interrupt" while the processing involved in the type of operation is executed, the command outputting processing outputs a command for suspending the processing which is being in execution and allowing a processing involved in the type of operation specified with the "interrupt" to be executed as a priority. Also, the command outputting processing outputs a command for allowing the suspended processing to be resumed after the processing specified with the "interrupt" is completed.

In accordance with another aspect of the present invention, an electronic apparatus comprises a voice inputting unit, a storing unit, a recognizing unit, a voice decoding unit, a determining unit and a command outputting unit. The voice inputting unit inputs a user's voice. The storing unit stores at least a predetermined type of operation and an authorized status for each of a plurality of users. The recognizing unit recognizes the user based on the information of the voice which is input through the voice inputting unit. The voice decoding unit decodes the voice information when the user is recognized by the recognizing unit. The determining unit determines if the information decoded by the voice decoding unit describes a type of operation stored in the storing unit or not. Also the determining unit determines if the user is authorized to perform the type of operation, when the determining unit determines the information describes the type of operation stored in the storing unit. The command outputting unit outputs a command for the type of operation, when the determining unit determines that the user is authorized to perform the type of operation.

According to the configuration described above, when each of the plurality of users, who is authorized to perform a type of operation, speaks the type of operation, the user is recognized, so that a processing involved in the type of operation can be performed in a condition corresponding to the user. This enables individual settings or grades for each user to be appropriately achieved in the electronic apparatus which is configured, on the assumption of its sharing by a plurality of users, to provide a plurality of functions. According to the present invention, when an authorized user among a plurality of users says a type of operation, the user is recognized, so that a processing involved in the type of operation specified by the recognized user is implemented. Therefore, an electronic apparatus configured, on the assumption of its sharing by a plurality of users, to provide a plurality of functions, which performs operations corresponding to individual settings or grades for each user, is provided.

It is preferable that the type of operation includes at least one selected from the group consisting of copy operation, facsimile transmission operation, and Email sending operation, and the storing unit stores setting information of a copy density and a number of sets to print when the type of operation is the copy operation, and stores setting information of destinations when the type of operation is the facsimile transmission operation and the Email sending operation.

According to the configuration described above, because the storing unit stores setting information of a copy density and a number of sets to print when the type of operation is the copy operation, and stores setting information of destinations when the type of operation is the facsimile transmission operation and the Email sending operation, no more setting is required to be input by a user to start the operations, and since all what each user needs to be aware of is his/her personal setting information, the user can use the electronic apparatus as his/her own.

It is preferable that the storing unit has a user table and a base table. The information of the destinations for facsimile transmission operation and Email sending operation is stored in the base table, and destination names which individually correspond to the destinations in the base table are stored in the user table with an individual number in the order of setting, for each of the users.

According to the configuration described above, the information of destinations is stored in the base table with a registered number for each destination, but each of the destination name is registered in the user table with another number in the order of setting independently of the registered number, for each user. This keeps the users unaware that there is some information with registered numbers in the base table which is inaccessible to them.

It is preferable that the electronic apparatus further comprises a displaying unit that displays the setting information, and a display controlling unit that controls a display on the displaying unit. The command outputting unit outputs a command to the display controlling unit to display the setting information on the displaying unit, when the determining unit determines that the user is authorized to perform the type of operation.

According to the configuration described above, a user can easily check his/her personal setting information displayed on the displaying unit.

It is preferable that the command outputting unit outputs a command to the display controlling unit to display the destination names stored in the user table on the displaying unit in the order of setting, when the determining unit determines that the user is authorized to perform the type of operation.

According to the configuration described above, a user can easily check his/her personal destination names displayed on the displaying unit in the order of setting.

It is preferable that when the voice decoding unit decodes the voice information of a setting number of a destination name which is stored in the user table and the determining unit determines that the user is authorized to perform the operation, the command outputting unit outputs a command for allowing the facsimile transmission operation or the Email sending operation to be executed to a destination corresponding to the setting number.

According to the configuration described above, a facsimile transmission operation and an Email sending operation can be automatically executed.

In accordance with another aspect of the present invention, a computer readable medium on which a voice operating program is recorded is provided. The voice operating program is configured to cause an electronic apparatus to execute processings comprising: a recognizing processing, a voice decoding processing, a determining processing and a command outputting processing. The recognizing processing recognizes a user based on the information of the voice which is input through the voice inputting unit. The voice decoding processing decodes the voice information, when the user is recognized by the recognizing processing. The determining processing determines if the information decoded in the voice decoding processing describes a type of operation, with reference to storing unit which stores at least a predetermined type of operation and an authorized status for each of a plurality of user. Also, the determining processing determines if the user is authorized to perform the type of operation, with reference to the storing unit, when the determining processing determines that the information describes the type of operation. The command outputting processing outputs a command for the type of operation, when the determining processing determines that the user is authorized to perform the type of operation.

In accordance with another aspect of the present invention, a voice operating program which is configured to make an electronic apparatus execute processings is provided. The processings comprise a voice decoding processing, a determining processing and a command outputting processing. The voice decoding processing decodes information of a voice which is input through a voice inputting unit. The determining processing determines if the voice decoded by the voice decoding processing describes a type of operation which is registered and stored for each of a plurality of users in advance or the type of operation and a word "interrupt". At least when the determining processing determines that the decoded voice describes a type of operation registered in advance, the command outputting processing outputs a command for allowing a processing involved in the type of operation to be executed. Also, when the determining processing determines that the decoded voice describes a type of operation registered in advance and a word "interrupt" while the processing involved in the type of operation is executed, the command outputting processing outputs a command for suspending the processing which is being in execution and allowing a processing involved in the type of operation specified with the "interrupt" to be executed as a priority. Also, the command outputting processing outputs a command for allowing the suspended processing to be resumed after the processing specified with the "interrupt" is completed.

In accordance with another aspect of the present invention, a method for controlling an electronic apparatus comprises steps of a voice decoding step, a determining step and a command outputting step. The voice decoding step decodes information of a voice which is input through a voice inputting unit. The determining step determines if the voice decoded by the voice decoding step describes a type of operation which is registered and stored for each of a plurality of users in advance or the type of operation and a word "interrupt". At least when the determining step determines that the decoded voice describes a type of operation registered in advance, the command outputting processing outputs a command for allowing a processing involved in the type of operation to be executed. Also, when the determining step determines that the decoded voice describes a type of operation registered in advance and a word "interrupt" while the processing involved in the type of operation is executed, the command outputting step outputs a command for suspending the processing which is being in execution and allowing a processing involved in the type of operation specified with the "interrupt" to be executed as a priority. Also, the command outputting step outputs a command for allowing the suspended processing to be resumed after the processing specified with the "interrupt" is completed.

In accordance with another aspect of the present invention, a voice operating program which is configured to make an electronic apparatus execute processings is provided. The processings comprise a recognizing processing, a voice decoding processing, a determining processing and a command outputting processing. The recognizing processing recognizes a user based on the information of the voice which is input through a voice inputting unit. The voice decoding processing decodes the voice information, when the user is recognized by the recognizing processing. The determining processing determines if the information decoded in the voice decoding processing describes a type of operation, with reference to a storing unit which stores at least a predetermined type of operation and an authorized status for each of a plurality of user. Also, the determining processing determines if the user is authorized to perform the type of operation, with reference to the storing unit, when the determining processing determines that the information describes the type of operation. The command outputting processing outputs a command for the type of operation, when the determining processing determines that the user is authorized to perform the type of operation.

In accordance with another aspect of the present invention, a method for controlling an electronic apparatus comprises steps of a recognizing step, a voice decoding step, a determining step and a command outputting step. The recognizing step recognizes a user based on the information of the voice which is input through a voice inputting unit. The voice decoding step decodes the voice information, when the user is recognized in the recognizing step. The determining step determines if the information decoded in the voice decoding step describes a type of operation, with reference to a storing unit which stores at least a predetermined type of operation and an authorized status for each of a plurality of user. Also, the determining step determines if the user is authorized to perform the type of operation, with reference to the storing unit, when the determining step determines that the information describes the type of operation. The command outputting step outputs a command for the type of operation, when the determining step determines that the user is authorized to perform the type of operation.

The above and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the drawings which form a part of this original disclosure:

FIG. 2 is a diagram showing a main table for storing a type of operation, authorized status on the type of operation, and setting information for each user;

FIG. 4 is a diagram showing a user table for storing, in the order of setting, destination names for facsimile transmission and Email sending for each user;

FIG. 5 is a diagram showing a base table for storing destination information for facsimile transmission and Email sending;

DETAILED DESCRIPTION OF THE PREFERRED EMBODIMENTS

Figure 1:
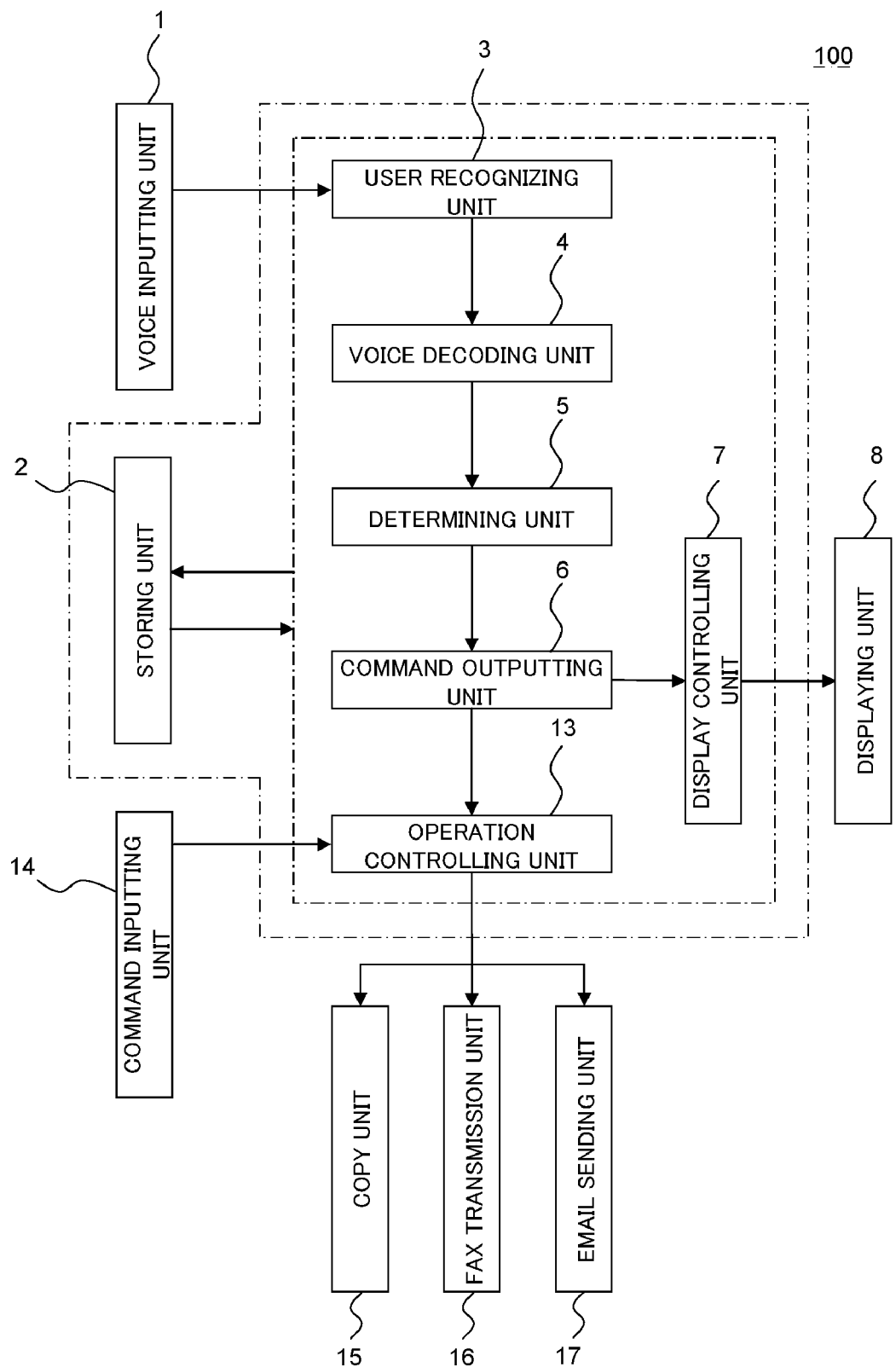
FIG. 1 is a block diagram showing a configuration of a first embodiment of an image forming apparatus according to the present invention.

Referring now to the drawings, preferred embodiments of the present invention will be described in detail.

First Embodiment

Figure 3:
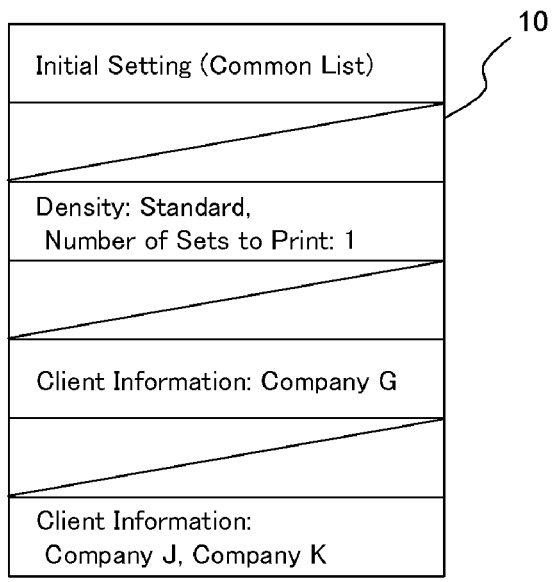
FIG. 3 is a diagram showing an initial setting table for storing initial setting information.
Figure 7:
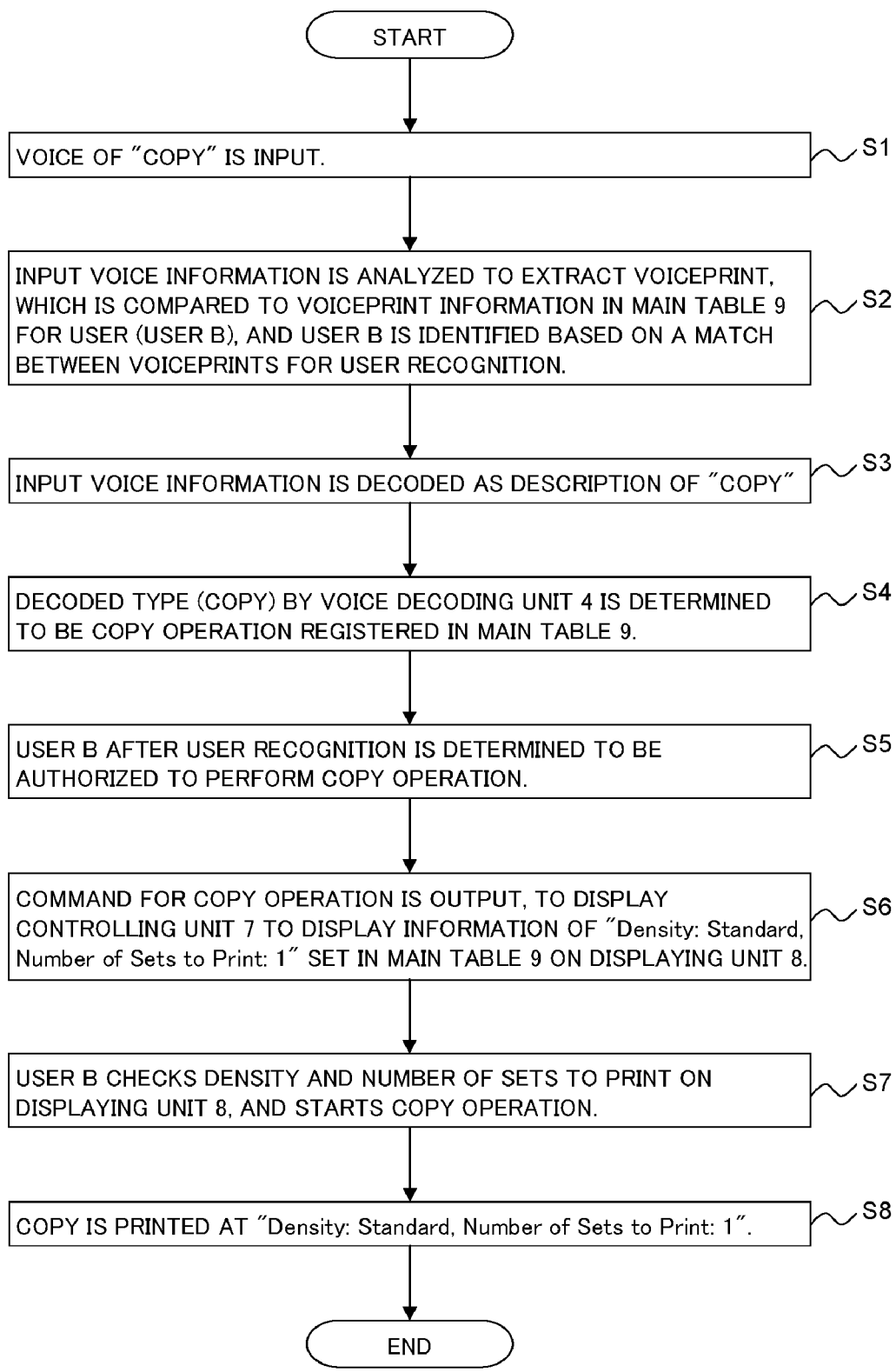
FIG. 7 is a flow chart showing a copy operation without an interrupt operation.
Figure 8:
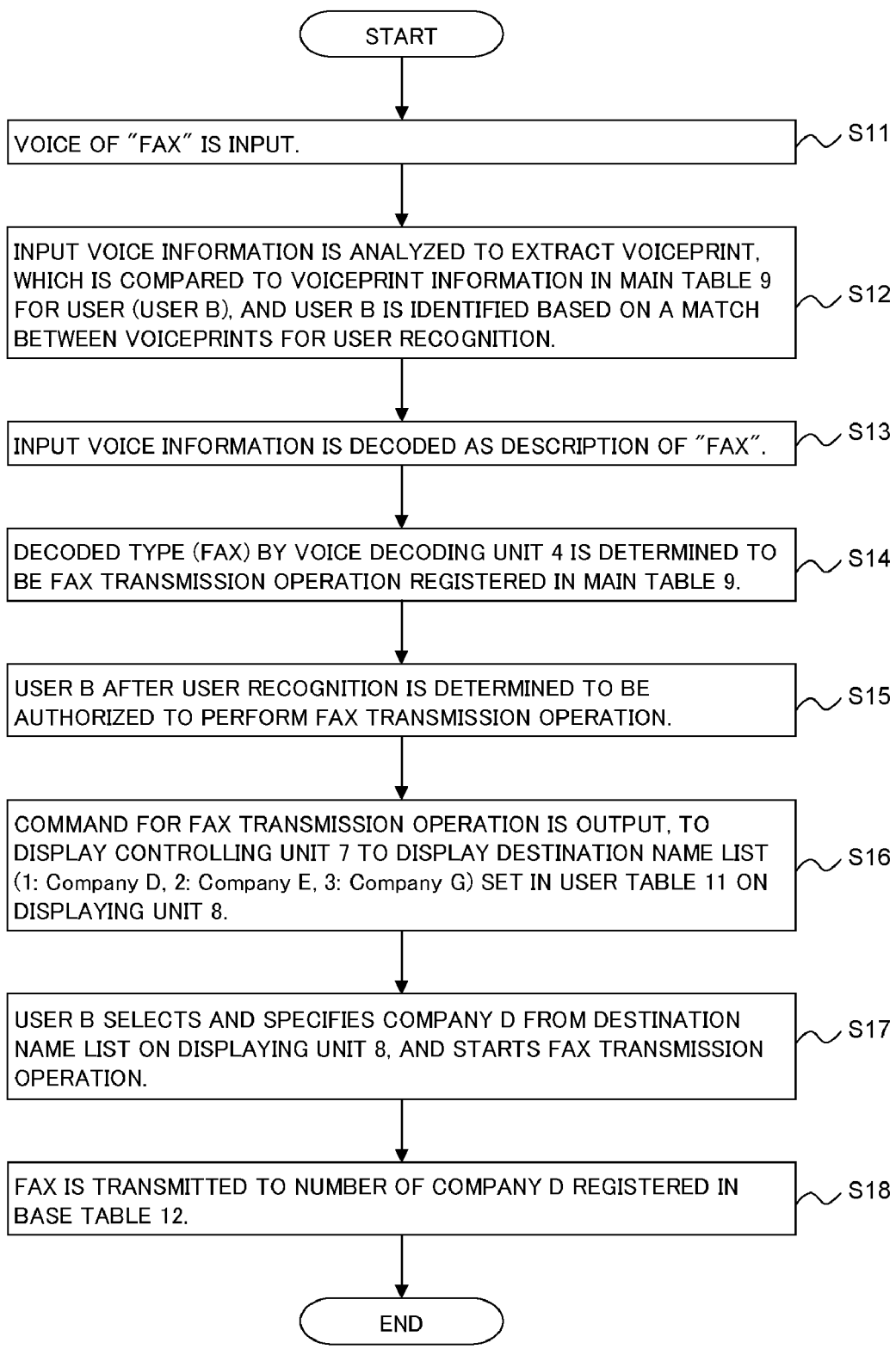
FIG. 8 is a flow chart showing a facsimile transmission operation without an interrupt operation.
Figure 9:
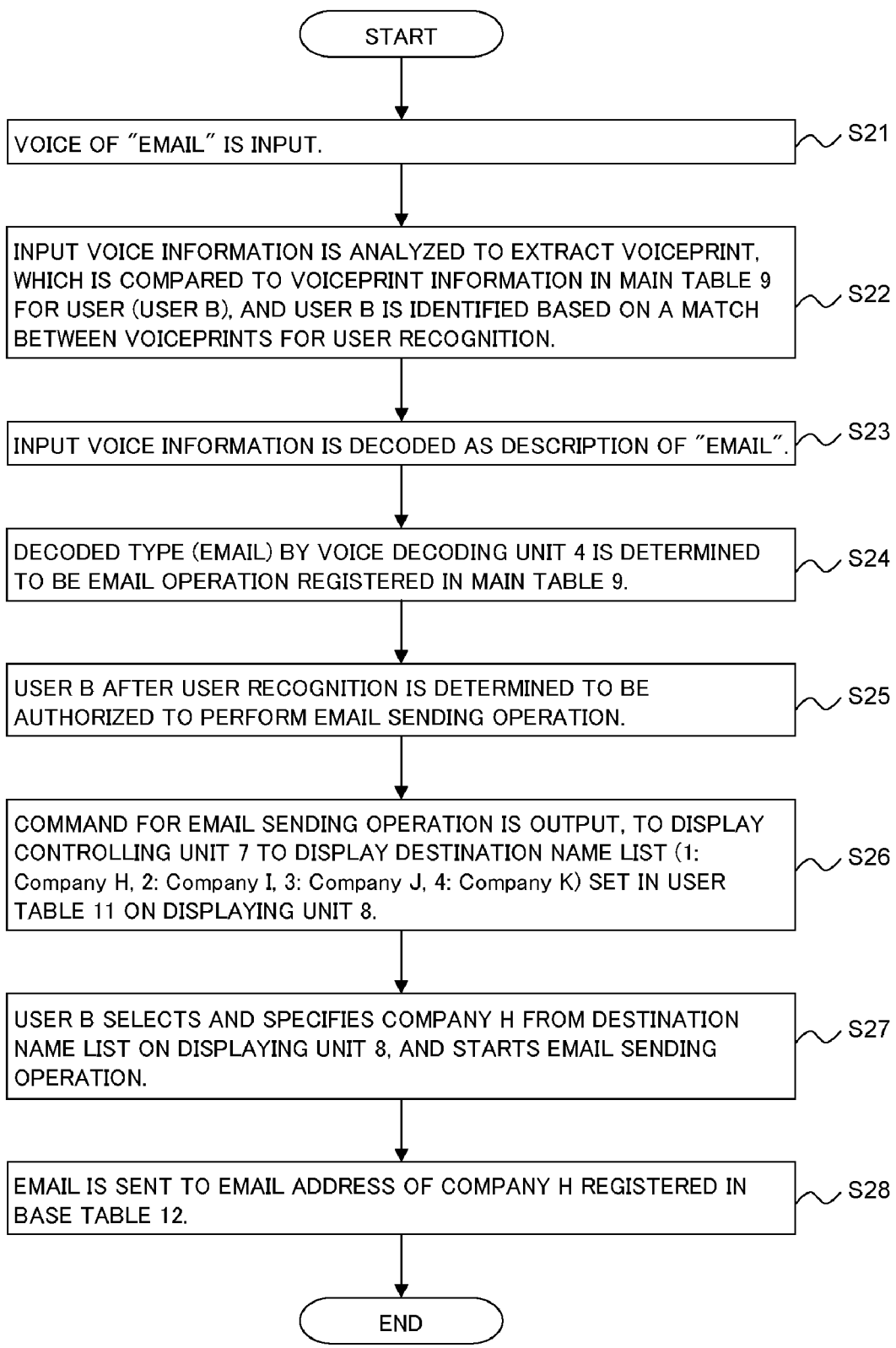
FIG. 9 is a flow chart showing an Email sending operation without an interrupt operation.
Figure 10A:
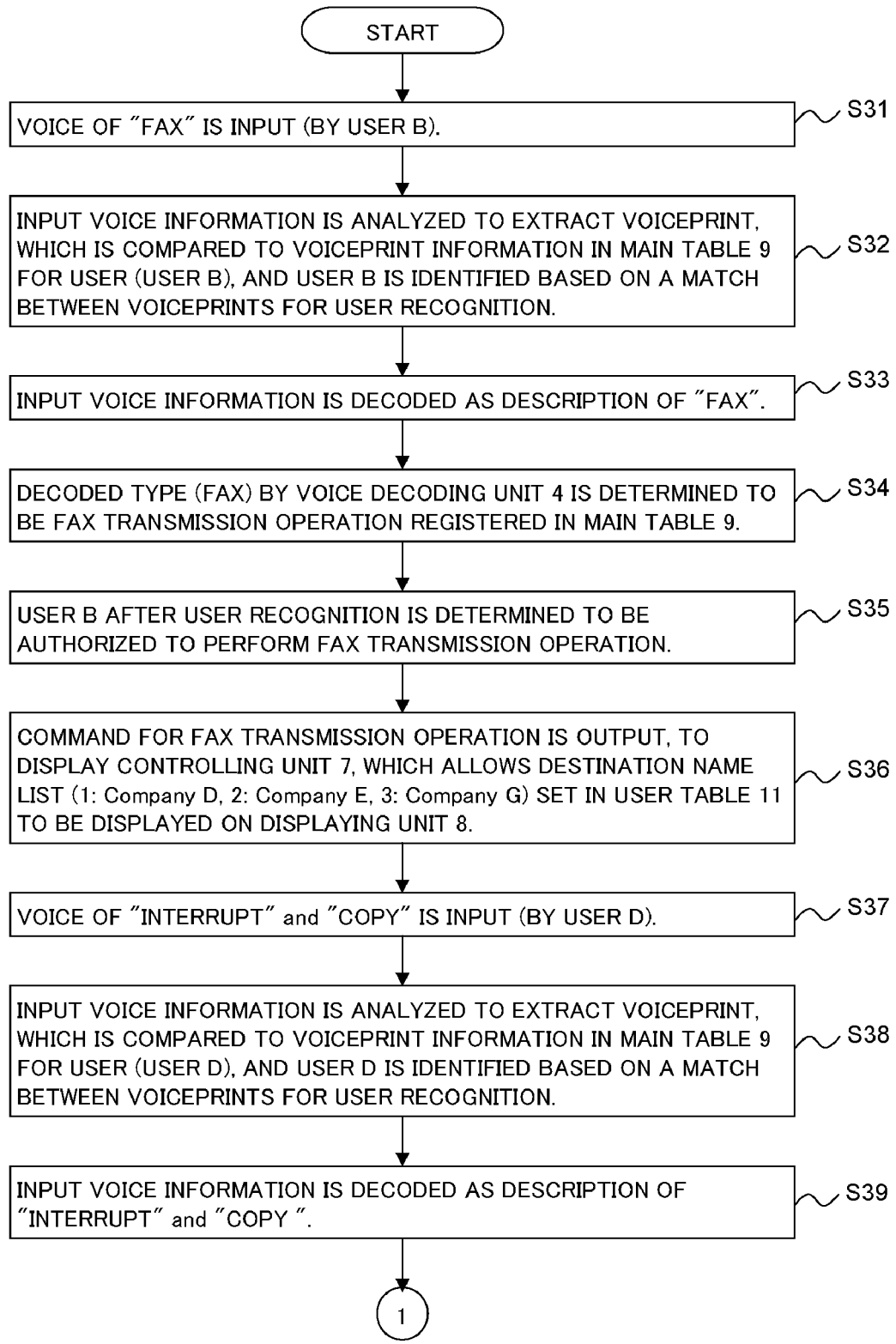
FIG. 10A is a flow chart showing a facsimile transmission operation (former part) with an interrupt operation.
Figure 10B:
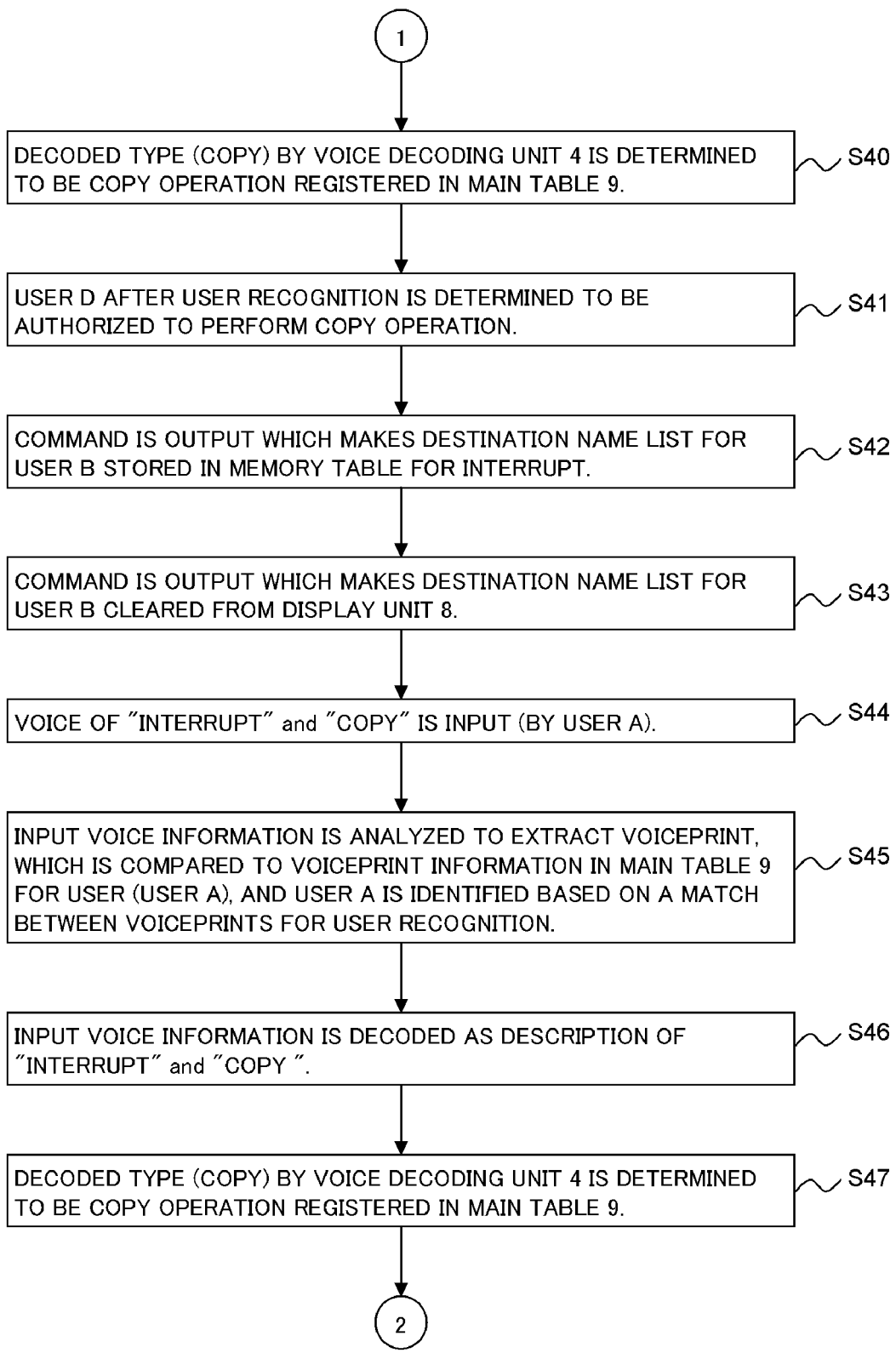
FIG. 10B is a flow chart showing a facsimile transmission operation (middle part) with an interrupt operation.
Figure 10C:
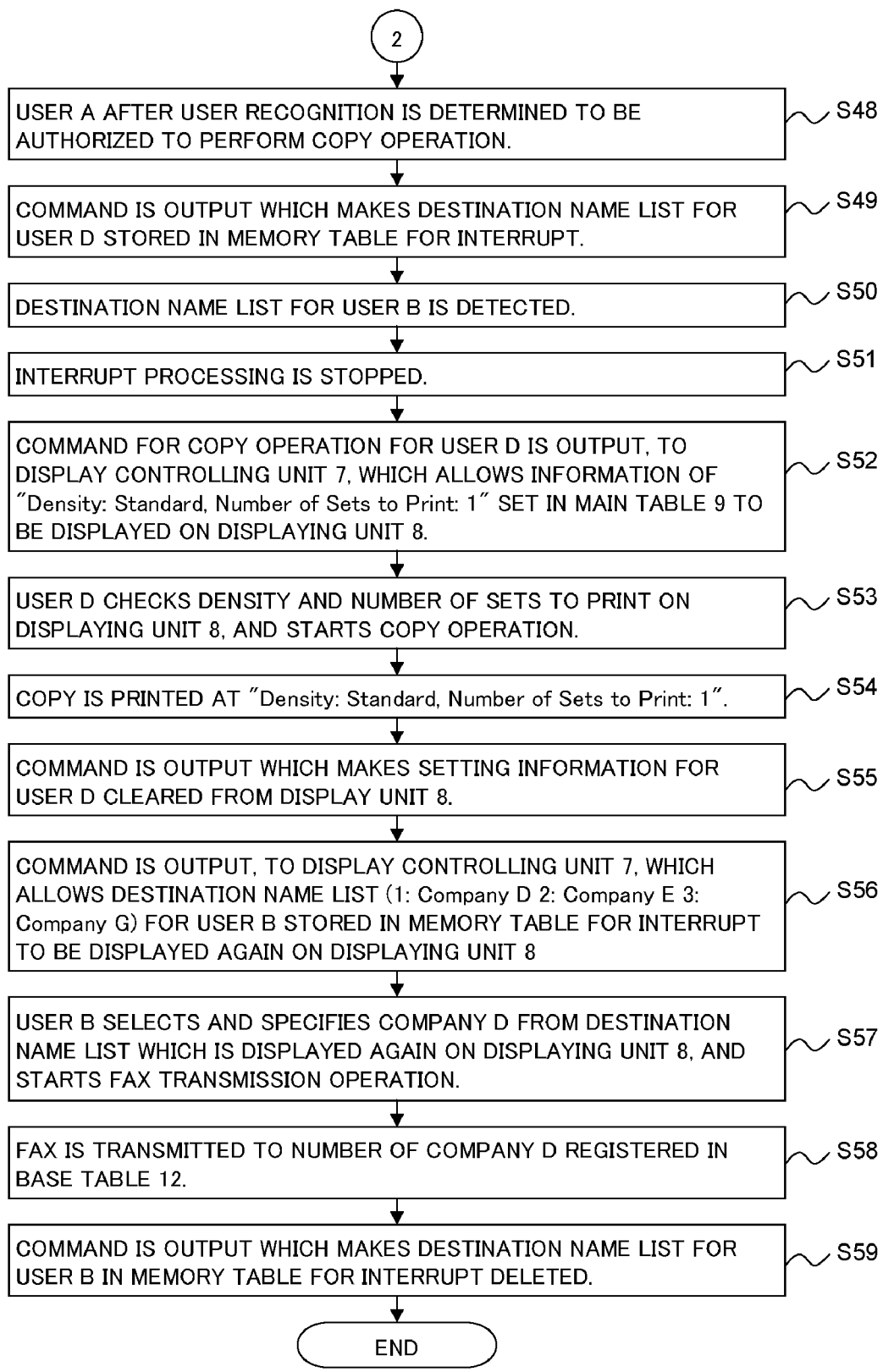
FIG. 10C is a flow chart showing a facsimile transmission operation (latter part) with an interrupt operation.

FIG. 1 is a block diagram showing a configuration of a first embodiment of an image forming apparatus according to the present invention. FIG. 2 is a diagram showing a main table for storing a type of operation, authorized status on the type of operations, and setting information for each user. FIG. 3 is a diagram showing an initial setting table for storing initial setting information. FIG. 4 is a diagram showing a user table for storing, in the order of setting, destination names for facsimile transmission and Email sending for each user. FIG. 5 is a diagram showing a base table for storing destinations for facsimile transmission and Email sending. FIG. 6 is a diagram showing display examples on a display panel. FIG. 7 is a flow chart showing a copy operation without an interrupt operation. FIG. 8 is a flow chart showing a facsimile transmission operation without an interrupt operation. FIG. 9 is a flow chart showing an Email sending operation without an interrupt operation. FIGS. 10A to 10C are flow charts showing a facsimile transmission operation with an interrupt operation.

A first embodiment of an image forming apparatus (electronic apparatus) 100 according to the present invention includes, as shown in FIG. 1, a voice inputting unit 1, a storing unit 2, a user recognizing unit 3, a voice decoding unit 4, a determining unit 5, a command outputting unit 6, a display controlling unit 7, a displaying unit 8, and an operation controlling unit 13. The image forming apparatus 100 further includes a command inputting unit 14, a copy unit 15, a facsimile transmission unit 16 and an Email sending unit 17. The storing unit 2 (ROM, hard disk, or the like) stores a voice operating program, which is loaded onto RAM for enabling CPU to execute processings of the user recognizing unit 3, the voice decoding unit 4, the determining unit 5, the command outputting unit 6, the display controlling unit 7 and/or, the operation controlling unit 13.

First, the storing unit 2 will be explained. The storing unit 2 includes a main table 9 (see FIG. 2), an initial setting table 10 (see FIG. 3), a user table 11 (see FIG. 4), and a base table 12 (see FIG. 5).

The main table 9 stores, as shown in FIG. 2, a type of operation, authorized status on the type of operation, setting information, and voiceprint information, for each of a plurality of users (User A, User B, User C, and guest(s), in this embodiment). The type of operation includes a copy operation, a facsimile (FAX) transmission operation, and an Email sending operation in this embodiment.

User A is authorized to perform copy operation and facsimile (hereinafter, referred to as Fax) transmission operation, and is not authorized to perform Email sending operation. User A has specified the setting for copy operation as "Density: High, Number of Sets to Print: 2", and specifies the setting of Fax transmission operation as "Initial Setting".

The term "Initial Setting" as used herein means a setting condition common to users who are authorized to perform operations, as shown in the initial setting table 10 of FIG. 3, where the initial setting for copy operation is defined as "Density: Standard, Number of Sets to Print: 1", the initial setting for Fax transmission operation is defined as "Client Information: Company G" which is the setting information of destination name, and the initial setting for Email sending operation is defined as "Client Information: Company J, Company K" which is the setting information of destination name.

So, the description of the "Initial Setting" for Fax transmission operation in FIG. 2 for User A, who is authorized to perform Fax transmission operation but not for Email sending operation, specifies "Client Information: Company G".

User B is authorized to perform all of copy operation, Fax transmission operation, and Email sending operation. The User B has specified the setting for copy operation as "Initial Setting (Density: Standard, Number of Sets to Print: 1)", the setting of destination names for Fax transmission operation as "Added Client Information: Company D, Company E (Client Information: Company D, Company E, Company G)", and the setting of destination names for Email sending operation as "Added Client Information: Company H, Company I (Client Information: Company H, Company I, Company J, Company K)".

User C is not authorized to perform copy operation, but is authorized to perform Fax transmission operation and Email sending operation. User C has specified the setting of destination names for Fax transmission operation as "Added Client Information: Company F (Client Information: Company F, Company G)", and the setting of destination names for Email sending operation as "Initial Setting (Client Information: Company J, Company K)".

Guest is authorized to perform copy operation, but is not authorized to perform Fax transmission operation and Email sending operation. The Guest has specified the setting for copy operation as "Initial Setting (Density: Standard, Number of Sets to Print: 1)".

The user table 11 stores, as shown in FIG. 4, the destination names specified in the settings for Fax transmission operation and Email sending operation in the main table 9, for each user by numbering the names in the order of setting.

The base table 12 registers, as shown in FIG. 5, destination information which corresponds to the destination names in the user table 11: that is, Fax numbers of Company D, Company E, Company F; and Company G, and Email addresses of Company H, Company I, Company J, and Company K. As for the numbers, each of the destination information (Fax numbers and Email addresses) in the base table 12 has a registration number which is different from the setting number given to the corresponding destination name in the user table 11.

The user recognizing unit 3 analyzes, as shown in FIG. 1, voice information which is input through the voice inputting unit 1 such as a microphone to extract a voiceprint thereof, and then searches for a match of the extracted voiceprint with any of voiceprint information of the users (User A, User B, User C) and guest(s) stored in the main table 9. When a match is found, the user recognizing unit 3 recognizes the user. The voice decoding unit 4 decodes the voice information input through the voice inputting unit 1, when the user recognizing unit 3 recognizes the user.

The determining unit 5 determines if the voice (type) decoded by the voice decoding unit 4 describes one of the types of operation which have been registered in the main table 9: copy, Fax transmission, and Email sending. The determining unit 5 also determines if the voice (type) decoded by the voice decoding unit 4 describes a word "interrupt" in addition to the one of the types of operation in the main table 9: copy, Fax transmission, and Email sending. When the determining unit 5 determines that the voice (type) describes one of the types of operation including copy, Fax transmission, and Email sending, or when the determining unit 5 determines that the voice (type) describes a word "interrupt" in addition to one of the types of operation including copy, Fax transmission, and Email sending, the determining unit 5 determines if the user who has been recognized by the user recognizing unit 3 is authorized to perform the operation (copy operation, Fax transmission operation, or Email sending operation) with reference to the main table 9.

When the determining unit 5 determines that the decoded voice (type) by the voice decoding unit 4 describes one type of operation out of copy, Fax transmission, and Email sending, and that the user is authorized to the type of operation, the command outputting unit 6 outputs: a command for copy operation to the display controlling unit 7 to display the setting information of a density and a number of sets to print specified in the main table 9 on the displaying unit 8 such as a liquid crystal display panel; a command for Fax transmission operation to the display controlling unit 7 to display a destination name list specified in the user table 11 on the displaying unit 8; or a command for the Email sending operation to the display controlling unit 7 to display a destination name list specified in the user table 11 on the displaying unit 8. The command outputting unit 6 also outputs to the operation controlling unit 13: a command for copy operation to execute copy operation with the setting information of a density and a number of sets to print specified in the main table 9 for the user; a command for FAX transmission operation to execute FAX transmission operation with the setting information of a destination name list specified in the user table 11 for Fax transmission operation for the user; or a command for Email sending operation to execute Email sending operation with the setting information of a destination name list specified in the user table 11 for Fax transmission operation for the user.

The operation controlling unit 13 receives: a command for copy operation to execute copy operation with the setting information of a density and a number of sets to print specified in the main table 9 for the user; a command for FAX transmission operation to execute FAX transmission operation with the setting information of a destination name list specified in the user table 11 for Fax transmission operation for the user; or a command for Email sending operation to execute Email sending operation with the setting information of a destination name list specified in the user table 11 for Fax transmission operation for the user. Further, the operation controlling unit 13 receives: the user command from the command inputting unit 14; a command for Fax transmission operation or Email sending operation to select a destination name out of the destination name list on the displaying unit 8; and a command to start the operation (copy, Fax transmission or Email sending). Upon receipt of the command to start the operation, the operation controlling unit 13 outputs: a command to the copy unit 15 to print a copy (copies) at the setting information of the density and the number of sets; a command to the Fax transmission unit 16 to transmit a fax to the Fax number which has been registered in the base table 12 for the destination name selected by the user; or a command to the Email sending unit 17 to send an Email to the Email address which has been registered in the base table 12 for the destination name selected by the user.

The command inputting unit 14 receives a command input by a user, such as a command for Fax transmission operation or Email sending operation to select a destination out of the destination name list on the displaying unit 8, and a command to start the operation (copy, Fax transmission or Email sending). The command inputting unit 14 can be, for example, operation buttons disposed on an outer panel of the image forming apparatus 100 or a touch panel disposed on the displaying unit 8. Also a user can change a density and a number of sets to print by command inputting unit 14 when he/she confirms the setting information on the displaying unit 8.

Figure 6A:
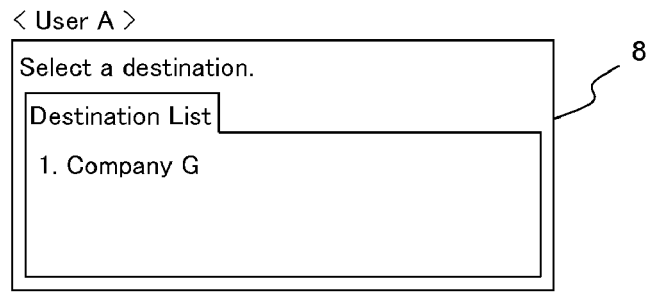
FIG. 6 is a diagram showing display examples on a display panel, with FIG. 6A being a diagram showing a destination list for Fax transmission for User A, FIG. 6B being a diagram showing a destination list for Fax transmission for User B.
FIG. 6C being a diagram showing a destination list for Fax transmission for User C, and FIG. 6D being a diagram showing a display for a guest who is not authorized to perform the Fax transmission operation.
Figure 6B:
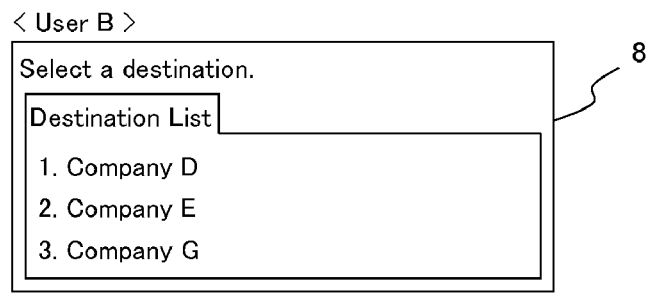
Figure 6C:
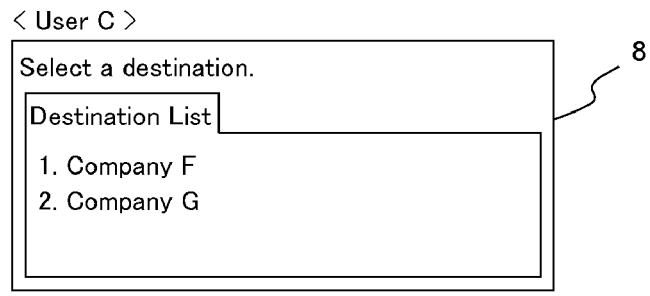
Figure 6D:
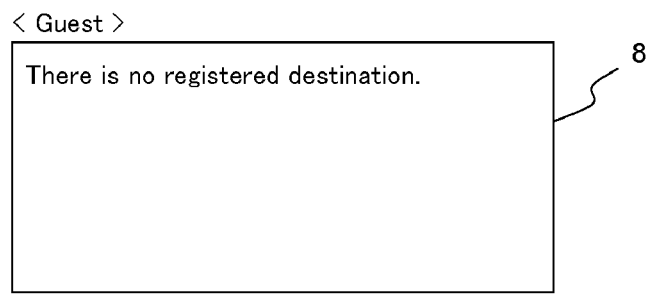

FIGS. 6A to 6D are diagrams showing display examples of destination lists on the displaying unit 8 for Fax transmission operation. FIG. 6A shows a destination list for User A; FIG. 6B shows a destination list for User B; FIG. 6C shows a destination list for User C; and FIG. 6D shows a display for a guest who is not authorized to perform the Fax transmission operation, with a message saying that there is no registered destination.

For copy operation, an authorized user checks the information of the density and the number of sets to print displayed on the displaying unit 8 and starts a copy operation, resulting in a copy (copies) of the number of sets being printed at the density, as set in the main table 9. For Fax transmission operation, an authorized user selects and specifies a destination from the destination name list displayed on the displaying unit 8 and starts a Fax transmission operation, resulting in a Fax being transmitted to the Fax number of the specified destination (the number has been registered in the base table 12). For Email sending operation, an authorized user selects and specifies a destination from the destination name list displayed on the displaying unit 8 and starts an Email sending operation, resulting in an Email being sent to the Email address of the specified destination (the address has been registered in the base table 12).

During an execution of the above described processings involved in copy operation, Fax transmission operation, or Email sending operation, if the determining unit 5 determines that a voice (type) decoded by the voice decoding unit 4 describes a word "interrupt" in addition to one type of operation (copy, Fax, Email) and that the user is authorized to the type of operation, the command outputting unit 6 makes the setting information (the density and the number of sets to print for copy operation, and the destination name lists for Fax transmission operation and Email sending operation) on the displaying unit 8 temporarily stored into a memory table for interrupt (not shown) in the storing unit 2 in order to postpone the processing in execution, and also outputs a command to the display controlling unit 7 to clear the setting information from the displaying unit 8.

Further when the interrupt operation is copy operation, the command outputting unit 6 outputs a command for copy operation to the display controlling unit 7 to display the setting information for the interrupting user of a density and a number of sets to print in the main table 9 on the displaying unit 8 such as a liquid crystal display panel. The command outputting unit 6 also outputs to the operation controlling unit 13, a command to suspend the processing which is being in execution and a command to execute the interrupt processing involved in copy operation as a priority together with the setting information for interrupting user. The operation controlling unit 13 suspends the processing which is being in execution and executes the interrupt processing involved in copy operation in advance. The interrupting user checks the density and number of sets to print displayed on the displaying unit 8 and starts a copy operation through the command inputting unit 14, so that the operation controlling unit 13 outputs a command to the copy unit 15 to print a copy (copies) at the density and the number of sets to print for the interrupting user, resulting in a copy (copies) of the number of sets being printed at the density as set in the main table 9.

When the interrupt operation is Fax transmission, the command outputting unit 6 outputs a command for Fax transmission operation to the display controlling unit 7 to display a destination name list for the interrupting user in the user table 11 on the displaying unit 8. The command outputting unit 6 also outputs to the operation controlling unit 13, a command to suspend the processing which is being in execution and a command to execute the interrupt processing involved in FAX transmission operation as a priority together with the setting information for interrupting user. The operation controlling unit 13 suspends the processing which is being in execution and executes the interrupt processing involved in FAX transmission operation in advance. The interrupting user selects and specifies a destination from the destination name list displayed on the displaying unit 8 and starts a Fax transmission operation through the command inputting unit 14, so that the operation controlling unit 13 outputs a command to the FAX transmission unit 16 to transmit a FAX to the Fax number of selected destination, resulting in a Fax being transmitted to the Fax number of the specified destination (the number has been registered in the base table 12).

When the interrupt operation is Email sending operation, the command outputting unit 6 outputs a command for Email sending operation to the display controlling unit 7 to display a destination name list for the interrupting user in the user table 11 on the displaying unit 8. The command outputting unit 6 also outputs to the operation controlling unit 13, a command to suspend the processing which is being in execution and a command to the interrupt processing involved in Email sending operation as a priority together with the setting information for interrupting user. The operation controlling unit 13 suspends the processing which is being in execution and executes the interrupt processing involved in Email sending operation in advance. The interrupting user selects and specifies a destination from a destination name list displayed on the displaying unit 8 and starts an Email sending operation through the command inputting unit 14, so that the operation controlling unit 13 outputs a command to the Email sending unit 17 to send an Email the Email address of selected destination, resulting in an Email being sent to the Email address of the specified destination (the address has been registered in the base table 12).

After the processing involved in the interrupt copy operation, the interrupt Fax transmission operation, or the interrupt Email sending operation is completed, the command outputting unit 6 outputs a command to the display controlling unit 7 to clear the setting information displayed on the displaying unit 8 during the interrupt processing, and also a command which causes the displaying unit 8 to display the setting information that has been temporarily stored in the memory table for interrupt. The outputting unit 6 also outputs a command to the operation controlling unit 13 which resumes the suspended processing, after the interrupt processing is completed, so that the operation controlling unit 13 resumes the suspended processing. This allows the setting information before the interrupt to be displayed again on the displaying unit 8, and the interrupted user resumes copy operation, Fax transmission operation, or Email sending operation. After the resumption, the command outputting unit 6 outputs a command which makes the setting information in the memory table for interrupt deleted.

Furthermore, during an execution of the above described interrupt processing, if the determining unit 5 determines that a voice (type) decoded by the voice decoding unit 4 describes a word "interrupt" in addition to one type of operation (copy, Fax, Email) and that the user is authorized to the type of operation, the command outputting unit 6 detects the presence of the setting information which has been stored in the memory table for interrupt, and executes a processing which prohibits any other interrupt processing.

Now, referring to FIGS. 7 to 9, performances of an image forming apparatus 100 in copy operation, Fax transmission operation, and Email sending operation, when User B makes a copy, transmits a Fax, and sends an Email without any interrupt, will be explained below. In this example, User B says "Copy" to input the voice through the voice inputting unit 1 for copy operation, says "Fax" to input the voice through the voice inputting unit 1 for Fax transmission operation, and says "mail" to input the voice through the voice inputting unit 1 for Email sending operation.

First, referring to FIG. 7, performances of an image forming apparatus 100 in copy operation when User B makes a copy will be explained. In this example, Step S1 corresponds to the voice inputting unit 1, Step S2 corresponds to the user recognizing unit 3, Step S3 corresponds to the voice decoding unit 4, Step S4 and Step S5 correspond to the determining unit 5, Step S6 corresponds to the command outputting unit 6, Step S7 corresponds to the command inputting unit 14 and the operation controlling unit 13, Step S8 corresponds to the copy unit 15, respectively.

In Step S1 the voice of "Copy" is input by User B, and in Step S2 the input voice is analyzed to extract a voiceprint, so that the obtained voiceprint is compared to voiceprint information of User B which has been stored in the main table 9 to identify User B for user recognition.

In Step S3, the input voice information is decoded to obtain a description of "Copy", and in Step S4 the decoded type (copy) is determined to be the copy operation which has been registered in the main table 9.

In Step S5, with reference to the main table 9, User B after user recognition is determined to be authorized to perform copy operation, and in Step S6, a command for copy operation is output to the display controlling unit 7 to display the setting information of "Density: Standard, Number of Sets to Print: 1" in the main table 9 on the displaying unit 8 such as a liquid crystal display panel.

In Step S7, User B checks the display of "Density: Standard, Number of Sets to Print: 1" on the displaying unit 8 and starts a copy operation through the command inputting unit 14, so that the operation controlling unit 13 outputs a command to the copy unit 15 to print a copy (copies) at the "Density: Standard, Number of Sets to Print: 1" as set in the main table 9, resulting in a copy being printed at the "Density: Standard, Number of Sets to Print: 1", as set in the main table 9, by the copy unit 15 in Step S8.

Next, referring to FIG. 8, performances of an image forming apparatus 100 in Fax transmission operation when User B transmits a Fax will be explained. In this example, Step S11 corresponds to the voice inputting unit 1, Step S12 corresponds to the user recognizing unit 3, Step S13 corresponds to the voice decoding unit 4, Step S14 and Step S15 correspond to the determining unit 5, Step S16 corresponds to the command outputting unit 6, Step S17 corresponds to the command inputting unit 14 and the operation controlling unit 13, and Step S18 corresponds to the FAX transmission unit 16, respectively.

In Step S11 the voice of "Fax" is input by User B, and in Step S12 the input voice is analyzed to extract a voiceprint, so that the obtained voiceprint is compared to voiceprint information of User B which has been stored in the main table 9 to identify User B for user recognition.

In Step S13, the input voice information is decoded to obtain a description of "Fax", and in Step S14 the decoded type (Fax) is determined to be the Fax transmission operation which has been registered in the main table 9.

In Step S15, with reference to the main table 9, User B after user recognition is determined to be authorized to perform Fax transmission operation, and then in Step S16, a command for Fax transmission operation is output to the display controlling unit 7 to display the destination name list (1: Company D, 2: Company E, 3: Company G) in the user table 11 on the displaying unit 8.

In Step S17, User B selects and specifies Company D out of the destination name list displayed on the displaying unit 8 and starts a Fax transmission operation through the command inputting unit 14, so that the operation controlling unit 13 outputs a command to the FAX transmission unit 16 to transmit a FAX to the FAX number of Company D which has been registered in the base table 12, resulting in a Fax being transmitted to the Fax number of Company D which has been registered in the base table 12, by the FAX transmission unit 16 in Step S18.

Next, referring to FIG. 9, performances of an image forming apparatus 100 in Email sending operation when User B sends an Email will be explained. In this example, Step S21 corresponds to the voice inputting unit 1, Step S22 corresponds to the user recognizing unit 3, Step S23 corresponds to the voice decoding unit 4, Step S24 and Step S25 correspond to the determining unit 5, Step S26 corresponds to the command outputting unit 6, Step S27 corresponds to the command inputting unit 14 and the operation controlling unit 13, and Step S28 corresponds to the Email sending unit 17, respectively.

In Step S21 the voice of "Email" is input by User B, and in Step S22 the input voice is analyzed to extract a voiceprint, so that the obtained voiceprint is compared to voiceprint information of User B which has been stored in the main table 9 to identify User B for user recognition.

In Step S23, the input voice information is decoded to obtain a description of "Email", and in Step S24 the decoded type (Email) is determined to be the Email sending operation which has been registered in the main table 9.

In Step S25, with reference to the main table 9, User B after user recognition is determined to be authorized to perform Email sending operation, and then in Step S26, a command for Email sending operation is output to the display controlling unit 7 to display the destination name list (1: Company H, 2: Company I, 3: Company J, 4: Company K) in the user table 11 on the displaying unit 8.

In Step S27, User B selects and specifies Company H out of the destination name list displayed on the displaying unit 8 and starts an Email sending operation by the command inputting unit 14, so that the operation controlling unit 13 outputs a command to the Email sending unit 17 to send an Email to the Email address of Company H which has been registered in the base table 12, resulting in an Email being sent to the Email address of Company H which has been registered in the base table 12, by the Email sending unit 17 in Step S28.

Next, referring to FIG. 10A, performances of an image forming apparatus 100 in Fax transmission operation for User B with an interrupt copy processing by User D (Guest) and an interrupt copy processing by User A, will be explained. In this example, User B says "Fax" to input the voice through the voice inputting unit 1, and User D says "Interrupt" and "Copy" to input the voice through the voice inputting unit 1, and User A says "Interrupt" and "Copy" to input the voice through the voice inputting unit 1. Step S31, Step S37 and Step S44 correspond to the voice inputting unit 1; Step S32, Step S38 and Step S45 correspond to the user recognizing unit 3; Step S33, Step S39 and Step S46 correspond to the voice decoding unit 4; Step S34, Step S35, Step S40, Step S41, Step S47 and Step S48 correspond to the determining unit 5; and Step S36, Step S42, Step S43, Step S49 to Step S52, Step S55, Step S56 and Step S59 correspond to the command outputting unit 6, Step S53 and S57 correspond to the command inputting unit 14 and the operation controlling unit 13, Step S54 corresponds to the copy unit 15, and Step S58 corresponds to the FAX transmission unit 16, respectively.

In Step S31, the voice of "Fax" is input by User B, and in Step S32 the input voice is analyzed to extract a voiceprint, so that the obtained voiceprint is compared to voiceprint information of users (User B) which has been stored in the main table 9 to identify User B for user recognition.

In Step S33, the input voice information is decoded to obtain a description of "Fax", and in Step S34 the voice (Fax) decoded by the voice decoding unit 4 is determined to be the Fax transmission operation which has been registered in the main table 9.

In Step S35, with reference to the main table 9, User B after user recognition is determined to be authorized to perform Fax transmission operation, and then in Step S36, a command for Fax transmission operation is output to the display controlling unit 7 to display the destination name list (1: Company D, 2: Company E, 3: Company G) set in the user table 11 on the displaying unit 8.

In Step S37, the voice of "Interrupt" and "Copy" is input by User D, and then in Step S38, the input voice information is analyzed to extract a voiceprint, so that the obtained voiceprint is compared to voiceprint information of users (User D) which has been stored in the main table 9 to identify User D for user recognition.

In Step S39, the input voice information is decoded to obtain a description of "Interrupt" and "Copy", and in Step S40 the decoded voice (copy) is determined to be the copy operation which has been registered in the main table 9.

In Step S41, with reference to the main table 9, User D after user recognition is determined to be authorized to perform copy operation, and then in Step S42, a command is output to the storing unit 2 which makes the destination name list for User B to be stored in the memory table for interrupt, and in Step S43 a command is output to the display controlling unit 7 which makes the destination name list for User B cleared from the displaying unit 8.

In Step S44, the voice of "Interrupt" and "Copy" is input by User A, and then in Step S45, the input voice information is analyzed to extract a voiceprint, so that the obtained voiceprint is compared to voiceprint information of users (User A) which has been stored in the main table 9 to identify User A for user recognition.

In Step S46, the input voice information is decoded to obtain a description of "Interrupt" and a "Copy", and in Step S47 the voice (copy) decoded by the voice decoding unit 4 is determined to be the copy operation which has been registered in the main table 9.

In Step S48, with reference to the main table 9, User A after user recognition is determined to be authorized to perform copy operation, and then in Step S49, a command is output to the storing unit 2 which makes the destination name list for User D to be stored in the memory table for interrupt.

In Step S50, the presence of the destination name list for User B in the memory table for interrupt is detected by the storing unit 2, and the command outputting unit 6 receives the detection and in Step 51, the command outputting unit 6 stops the interrupt processing for User A.

In Step S52, a command for copy operation for User D is output to the display controlling unit 7 to display the information of "Density: Standard, Number of Sets to Print: 1" set in the main table 9 on displaying unit 8, thereby in Step S53 User D checks the density and the number of sets to print on the displaying unit 8 and starts a copy operation, resulting in a copy being printed at "Density: Standard, Number of Sets to Print: 1", in Step S54.

In Step S55, a command is output to the display controlling unit 7 which makes the setting information for User D cleared from the displaying unit 8, and then in Step S56 a command is output to the display controlling unit 7 which allows the destination name list for User B (1: Company D, 2: Company E, 3: Company G) which has been stored in the memory table for interrupt to be displayed again on the displaying unit 8.

In Step S57, User B selects and specifies Company D from the destination name list which is displayed again on the displaying unit 8 and starts a Fax sending operation, resulting in a Fax being a transmitted to the Fax number of Company D which has been registered in the base table 12, in Step S58. Then in Step S59, a command is output to the storing unit 2 which makes the destination name list for User B which has been stored in the memory table for interrupt deleted.

As can be seen from the above explanation, in this embodiment, an authorized user among a plurality of users (User A, User B, User C, and Guest) says a type of operation (copy, Fax, Email) for user recognition, so that a processing involved in the type of operation (copy, Fax, Email) specified by the recognized user is performed (display of information of density and number of sets to print for copy, and display of destination lists for Fax and Email). This enables individual settings or grades for each user to be appropriately achieved in the electronic apparatus which is configured, on the assumption of its sharing by a plurality of users, to provide a plurality of functions.

When a user says "Interrupt" in addition to one of the types of operation (copy, Fax, Email), the processing in execution is postponed to execute a processing involved in the interrupt type of operation (copy, Fax, Email) as a priority. After the priority processing is completed, the postponed processing is resumed. In this way, a normal operation and an interrupt operation based on a user's voice can be performed in the electronic apparatus which is configured, on the assumption of its sharing by a plurality of users, to provide a plurality of functions.

Moreover, since the storing unit 2 stores setting information of a copy density and a number of sets to print for copy operation, and setting information of destinations for Fax transmission operation and Email sending operation, no more setting is required to be input by users to start the operations, and also, since all what each user needs to be aware of is his/her personal setting information, the user can use the image forming apparatus as his/her own.

Furthermore, the information of the destinations (Fax number, Email address) is stored in the base table 12 with a registered number for each destination, but the each of the destination is registered in the user table 11 with another number in the order of setting independently of the registered number, for each user. This keeps the users unaware that there is some information with registered numbers in the base table 12 which is inaccessible to them.

Second Embodiment

Figure 11:
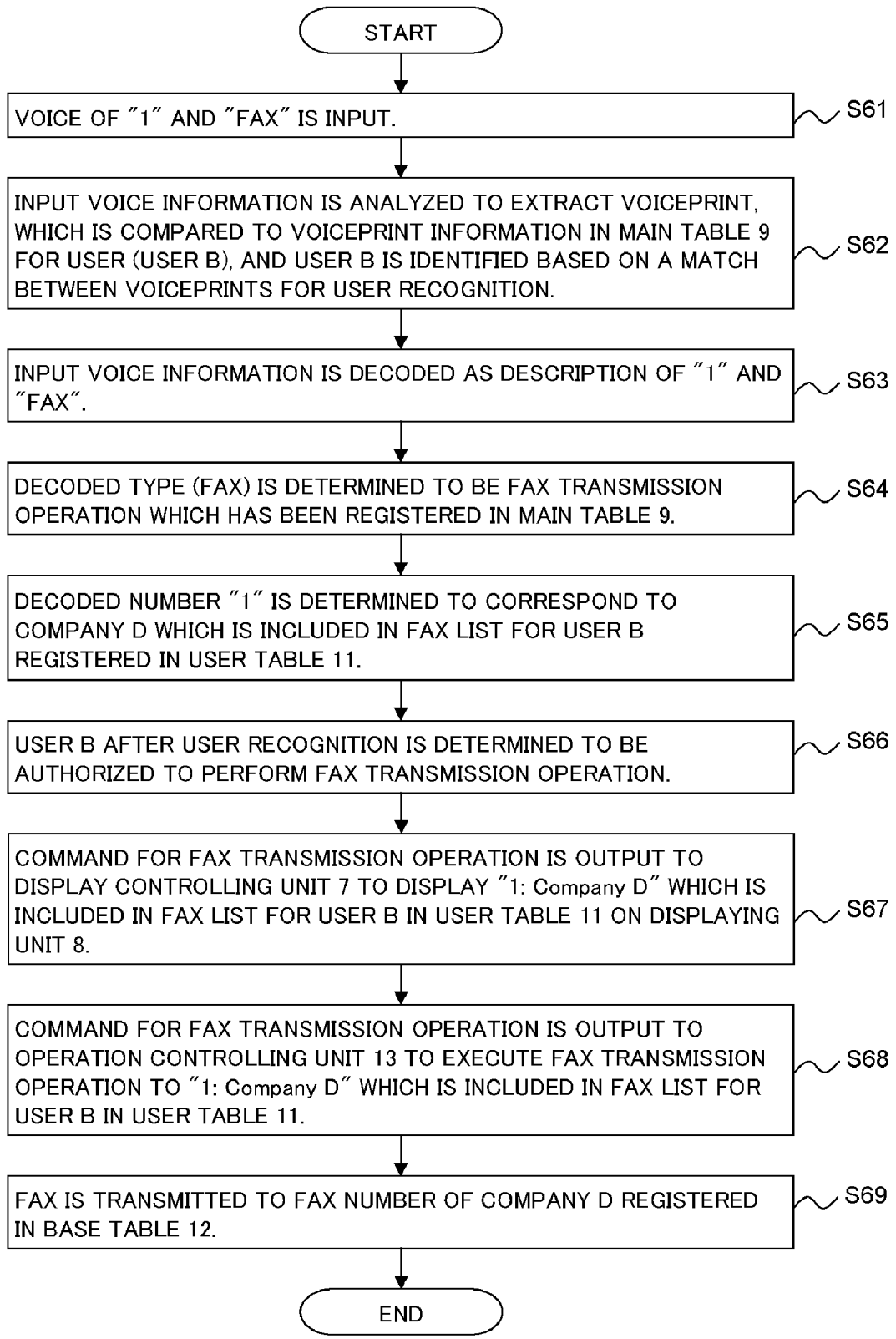
FIG. 11 is a flow chart showing a facsimile transmission operation.
Figure 12:
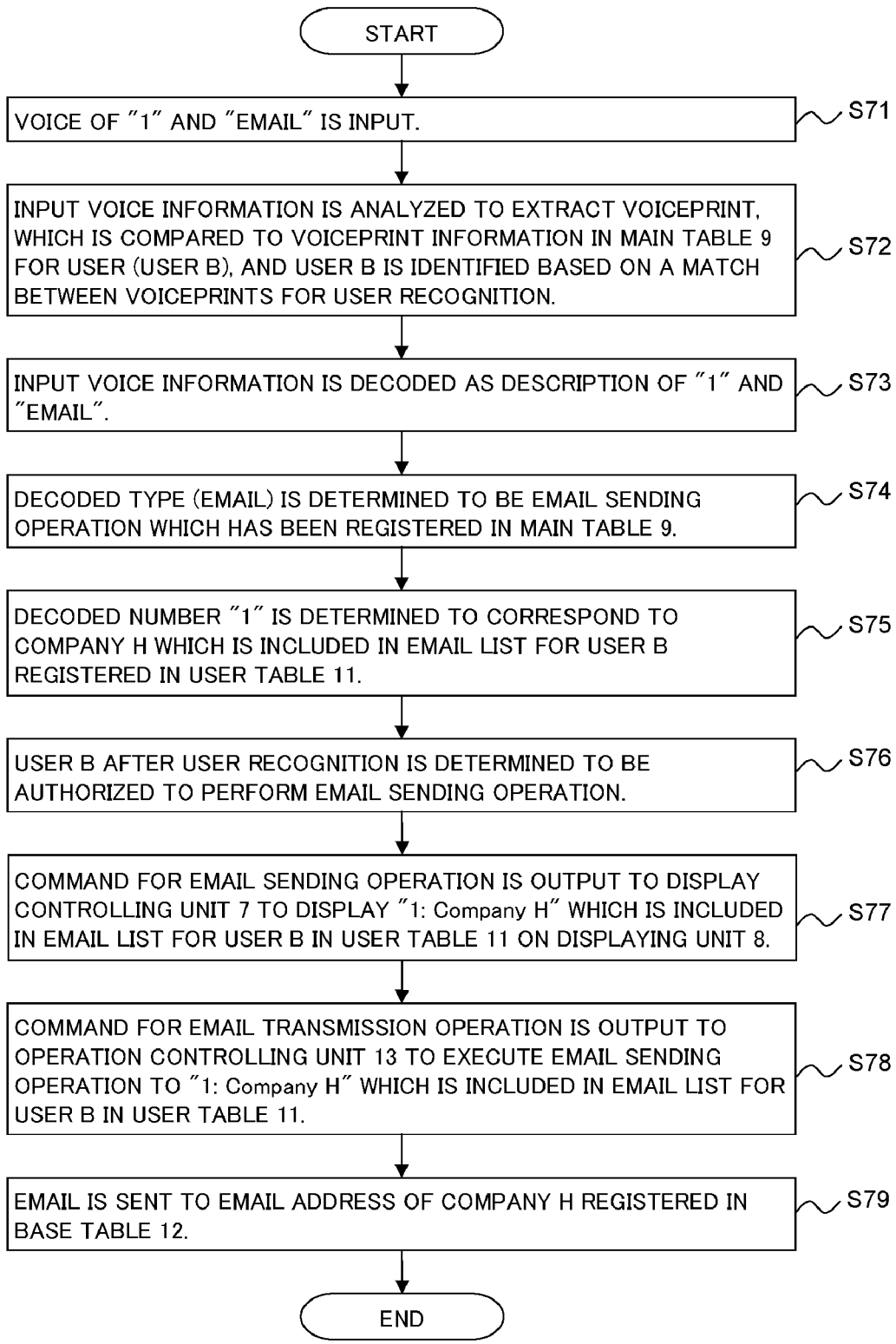
FIG. 12 is a flow chart showing an Email sending operation.

Now, referring to FIGS. 11 to 12, a second embodiment of an image forming apparatus according to the present invention will be explained below. The configuration of the second embodiment of an image forming apparatus according to the present invention is the same as the first embodiment of the image forming as described in FIG. 1. Only the differences between the first and second embodiments will be explained below. FIG. 11 is a flow chart showing a facsimile transmission operation according to the second embodiment of the image forming apparatus of the present invention. FIG. 12 is a flow chart showing an Email sending operation according to the second embodiment of the image forming apparatus of the present invention.

In this embodiment, for Fax transmission operation and Email sending operation, a user says a setting number in the user table 11 and a word "Fax" or "Email" (for example, "1" and "Fax", or "2" and "Email") to input the voice through the voice inputting unit 1. When voice decoding unit 4 decodes the voice information which describes the setting number in the user table 11 and a word of Fax or Email, and the command outputting unit 6 determines that the user is authorized to perform the operation, the command outputting unit 6 outputs a command to display controlling unit 7 to display a destination name corresponding to the setting number in the user table 11 on a displaying unit 8, and also outputs a command, to the operation controlling unit 13, which allows Fax transmission operation or Email sending operation to be executed. The operation controlling unit 13 outputs a command to the Fax transmission unit 16 to transmit a Fax to the FAX number (in base table 12) corresponding to the setting number, or a command to the Email sending unit 17 to send an Email to the Email address (in base table 12) corresponding to the setting number. This causes the FAX transmission unit 16 or the Email sending unit 17 to execute Fax transmission operation or Email sending operation.

Referring to FIGS. 11 to 12, performances of an image forming apparatus in Fax transmission operation and Email sending operation, when User B transmits a Fax to Company D and sends an Email to Company H will be explained. In this example, User B says "1" and "Fax" to input the voice through the voice inputting unit 1 so that a Fax transmission operation to Company D can be performed, and says "1" and "Email" to input the voice through the voice inputting unit 1 so that an Email sending operation to Company H can be performed.

First, referring to FIG. 11, performances of an image forming apparatus in Fax transmission operation when User B transmits a Fax to Company D will be explained. In this example, Step S61 corresponds to the voice inputting unit 1, Step S62 corresponds to the user recognizing unit 3, Step S63 corresponds to the voice decoding unit 4, Step S64 to Step S66 correspond to the determining unit 5, Step S67 and Step 68 correspond to the command outputting unit 6, and Step S69 corresponds to the operation controlling unit 13 and the Fax transmission unit 16, respectively.

In Step S61 the voice "1" and "Fax" is input by User B, and in Step S62 the input voice is analyzed to extract a voiceprint, so that the obtained voiceprint is compared to voiceprint information of User B which has been stored in the main table 9 to identify User B for user recognition.

In Step S63, the input voice information is decoded to obtain a description of "1" and "Fax", and in Step S64 the decoded type "Fax" is determined to be the Fax operation which has been registered in the main table 9, and also in Step S65 the decoded number "1" is determined to correspond to the Company D in the Fax list for User B which has been registered in the user table 11.

In Step S66, with reference to the main table 9, User B after user recognition is determined to be authorized to perform Fax transmission operation, and in Step S67, a command for Fax transmission operation is output to the display controlling unit 7 to display "1: Company D" of the Fax list for User B on the displaying unit 8.

In Step S68, a command for Fax transmission operation is output to the operation controlling unit 13 to execute Fax transmission operation for the "1: Company D" of the Fax list for User B by the command outputting unit 6, so that the operation controlling unit 13 outputs a command to the FAX transmission unit 16 to send a FAX to the FAX number of the setting number, thereby a Fax is transmitted by fax transmission unit 16 to a Fax number of Company D which has been registered in the base table 12 in Step S69. In this embodiment, since the operation controlling unit 13 receives the destination specified by the user's voice from the command outputting unit 6, the operation controlling unit 13 can make the FAX transmission unit 16 automatically execute the operation without a command to select a destination and a command to start through the command inputting unit 14.

Next, referring to FIG. 12, performances of an image forming apparatus in Email sending operation when User B sends an Email to Company H will be explained. In this example, Step S71 corresponds to the voice inputting unit 1, Step S72 corresponds to the user recognizing unit 3, Step S73 corresponds to the voice decoding unit 4, Step S74 to Step S76 correspond to the determining unit 5, Step S77 and Step 78 correspond to the command outputting unit 6, and Step S79 corresponds to the operation controlling unit 13 and the Email sending unit 17, respectively.

In Step S71 the voice "1" and "Email" is input by User B, and in Step S72 the input voice information is analyzed to extract a voiceprint, so that the obtained voiceprint is compared to voiceprint information of User B which has been stored in the main table 9 to identify User B for user recognition.

In Step S73, the input voice information is decoded to obtain a description of "1" and "Email", and in Step S74 the decoded type "Email" is determined to be the Email operation which has been registered in the main table 9, and also in Step S75 the decoded number "1" is determined to correspond to the Company H in the Email list for User B which has been registered in the user table 11.

In Step S76, with reference to the main table 9, User B after user recognition is determined to be authorized to perform Email sending operation, and in Step S77, a command for Email sending operation is output to the display controlling unit 7 to display "1: Company H" of the Fax list for User B on the displaying unit 8.

In Step S78, a command for Email sending operation is output to the operation controlling unit 13 to execute Email sending operation for the "1: Company H" of the Fax list for User B by the operation outputting unit 6, so that the operation controlling unit 13 outputs a command to the Email sending unit 17 to send an Email to the Email address of the setting number thereby an Email is transmitted by the Email sending unit 17 to an Email address of Company H which has been registered in the base table 12, in step Step S79. In this embodiment, since the operation controlling unit 13 receives the destination specified by the user's voice from the command outputting unit 6, the operation controlling unit 13 can make the Email sending unit 17 automatically execute the operation without a command to select a destination and a command to start through the command inputting unit 14.

In this way, in this embodiment, Fax transmission operation and Email sending operation can be automatically performed based on input voice of users. Other configuration and properties of the second embodiment are the same as in the first embodiment described above.

Figure 13:
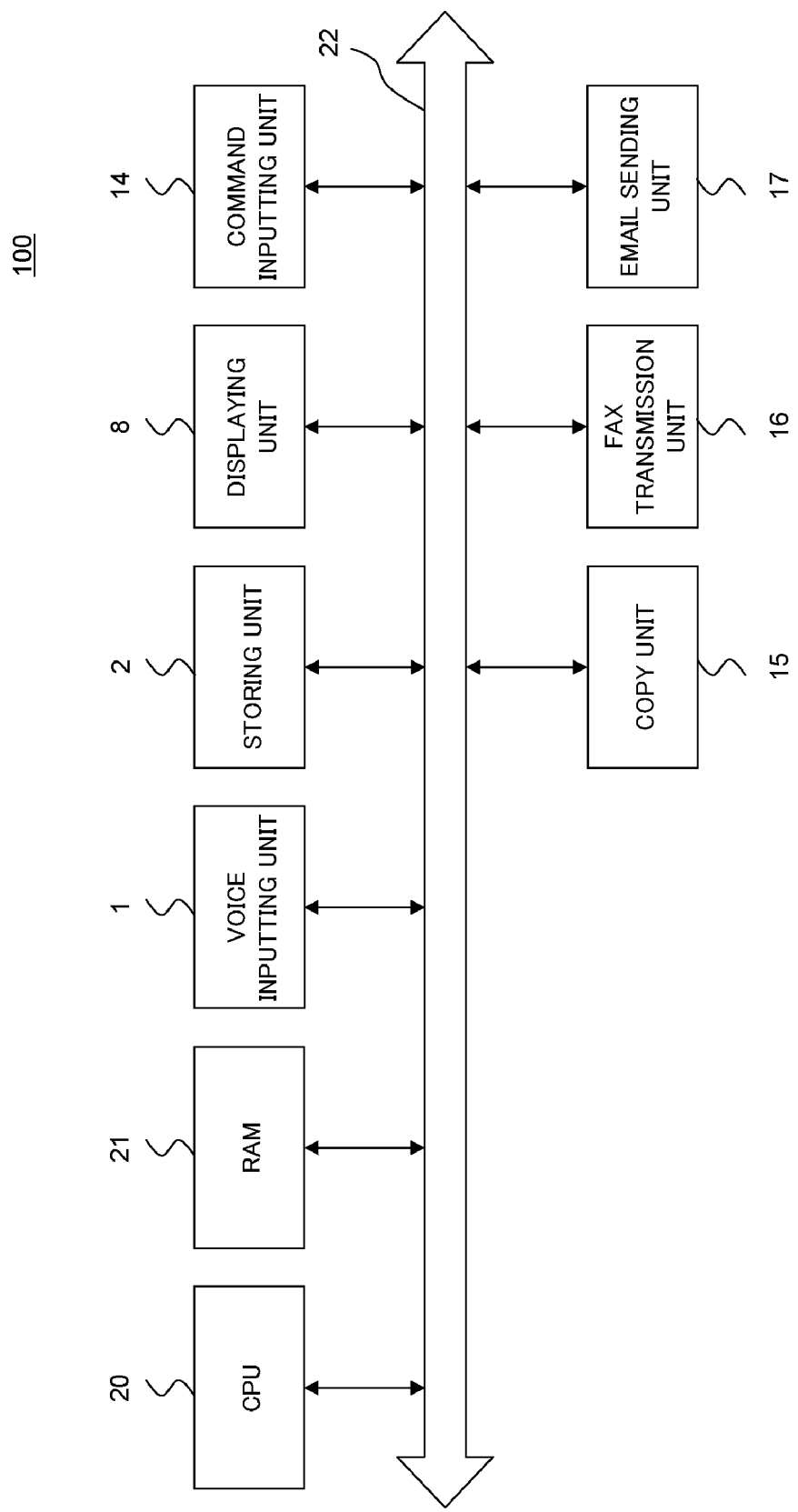
FIG. 13 is a example of a hardware configuration of an image forming apparatus according to the present invention.

FIG. 13 shows an example to a hardware configuration of the image forming apparatus 100 described above. The storing unit 2 stores a voice operating program which is loaded onto RAM 21 for enabling a CPU 20 to execute processings of the user recognizing unit 3, the voice decoding unit 4, the determining unit 5, the command outputting unit 6, the display controlling unit 7 and/or the operation controlling unit 13 (as shown in FIG. 1). The user recognizing unit 3, the voice decoding unit 4, the determining unit 5, the command outputting unit 6, the display controlling unit 7 and/or the operation controlling unit 13 can be implemented by the CPU 20. The voice inputting unit 1 can be implemented, for example, by a microphone. The displaying unit 8 can be implemented, for example, by a liquid crystal display. The command inputting unit 14 can be implemented, for example, by operation buttons disposed on an outer panel of the image forming apparatus 100 or a touch panel disposed on the displaying unit 8. The copy unit 15, the FAX transmission unit 16 and the Email sending unit 17 can be implemented by a copy unit, a FAX transmission unit and an Email sending unit of a conventional Multi User Peripheral (MPF). Part of the voice inputting unit 1, the storing unit 2, the user recognizing unit 3, the voice decoding unit 4, the determining unit 5, the command outputting unit 6, the display controlling unit 7, the displaying unit 8, the operation controlling unit 13 and the command inputting unit 14 can be implemented on a personal computer (PC) connected with the image forming apparatus 100 via network.

Now, a voice operating program will be explained below. Such voice operating functions in the above embodiment of a computer (e.g. image forming apparatus) can be implemented by a voice operating program which is stored in storing unit (e.g. ROM or HDD).

The voice operating program, upon being read in controlling unit of the computer (CPU or the like), issues commands to each component of the computer to execute voice operating processings including, for example, a user recognition processing, an input voice information decoding processing, an authorized status determining processing, an operation determining processing, a destination determining processing, a processing for outputting a command for a type of operation, and an interrupt processing.

Each of these processings can be implemented through cooperation between the voice operating program and each component of the computer (e.g. image forming apparatus) which is a hardware source.

A voice operating program according to the present invention for implementation of voice operating processings may be stored in ROM or on hard disk of a computer, as well as on a computer readable record medium such as external memory unit and transportable record medium.

The external memory unit includes a storage medium such as CD-ROM, and may be for example a memory expansion unit which is externally connected to an image forming apparatus or the like. While, the transportable record medium can be mounted to a record medium driving unit (drive unit) and also can be portable, which may be for example a flexible disk, a memory card, and a magneto-optical disk.

The program stored in the record medium is, after being loaded to RAM of the computer, executed by CPU. In this way, the functions of voice operating processings in the embodiment described above are implemented.

When a voice operating program of the present invention is loaded with a computer, the voice operating program held by other computer may be downloaded into the RAM or external memory unit of the computer via a communication line. Such downloaded voice operating program will also be executed by CPU to implement the functions of voice operating processings in the embodiment described above.

The present invention is not limited to the configuration in the above embodiment which includes a voice inputting unit, a storing unit, a user recognizing unit, a voice decoding unit, a determining unit, a command outputting unit, an operation controlling unit, a command inputting unit, a user table, a base table, a displaying unit, and a display controlling unit, and various changes and modification can be added to the configuration as needed without departing from the principle of the present invention.

For example, an image forming apparatus is used as an electronic apparatus in the above embodiments, but the present invention is not limited to an image forming apparatus. The present invention may be applied to an ATM (automatic teller machine) for banks, an electronic money terminal device (for example, FeliCa/Edy® terminal device), a personal computer, various appliances, and the like.

What is claimed is:

1. An electronic apparatus comprising:
   a voice inputting unit that inputs a user's voice;
   a storing unit that stores at least a predetermined type of operation for each of a plurality of users;
   a voice decoding unit that decodes information of the voice which is input through the voice inputting unit;
   a determining unit that determines if the voice decoded by the voice decoding unit describes a type of operation in the storing unit or describes a type of operation in the storing unit and a word "interrupt"; and
   a command outputting unit that, at least when the determining unit determines that the decoded voice describes a type of operation in the storing unit, outputs a command for allowing a processing involved in the type of operation to be executed, the command outputting unit being configured; when the determining unit determines that the decoded voice describes a type of operation in the storing unit and a word "interrupt" while the processing involved in the type of operation is executed, to output a command for suspending the processing which is being in execution and allowing a processing involved in the type of operation specified with the "interrupt" to be executed as a priority; and output a command for allowing the suspended processing to be resumed after the processing specified with the "interrupt" is completed.

2. The electronic apparatus according to claim 1,
further comprising a recognizing unit that recognizes the user based on the information of the voice which is input through the voice inputting unit;
wherein the storing unit stores an authorized status of each user to perform the type of operation;
the voice decoding unit decodes the voice information when the recognizing unit recognizes the user;
the determining unit determines if the user is authorized to perform the type of operation, when the determining unit determines that the decoded voice describes the type of operation or describes the type of operation and the word "interrupt"; and
the command outputting unit outputs a command which allows a processing involved in the type of operation to be executed, when the determining unit determines that the user is authorized to perform the type of operation.

3. The electronic apparatus according to claim 1, wherein the type of operation includes at least one selected from the group consisting of copy operation, facsimile transmission operation and Email sending operation, and
the storing unit stores setting information of a copy density and a number of sets to print when the type of operation is the copy operation, and stores setting information of destinations when the type of operation is the facsimile transmission operation and the Email sending operation.

4. The electronic apparatus according to claim 3, wherein the storing unit has a user table and a base table,
the information of the destinations for facsimile transmission operation and Email sending operation is stored in the base table, and
destination names which individually correspond to the destinations in the base table are stored in the user table with an individual number in the order of setting, for each of the users.

5. The electronic apparatus according to claim 3,
further comprising:
a displaying unit that displays the setting information, and
a display controlling unit that controls a display on the displaying unit,
wherein the command outputting unit outputs a command to the display controlling unit to display the setting information on the displaying unit when the determining unit determines that the user is authorized to perform the type of operation.

6. The electronic apparatus according to claim 5, wherein the command outputting unit outputs a command to the display controlling unit to display the destination names stored in the user table on the displaying unit in the order of setting, when the determining unit determines that the user is authorized to perform the type of operation.

7. The electronic apparatus according to claim 5, wherein, when the determining unit determines that the decoded voice describes the type of operation and the word "interrupt" while the displaying unit displays the setting information, the command outputting unit temporarily makes the setting information displayed on the displaying unit stored in a memory table for interrupt, and outputs a command to the display controlling unit to clear the setting information displayed on the displaying unit, and
after the processing involved in the interrupt type of operation is completed, the command outputting unit outputs a command to the display controlling unit to display the setting information stored in the memory table for interrupt on the displaying unit.

8. A computer readable medium on which a voice operating program is recorded, the voice operating program configured to cause an electronic apparatus to execute processings comprising:
a voice decoding processing that decodes information of a voice which is input through a voice inputting unit;
a determining processing that determines if the voice decoded in the voice decoding processing describes a type of operation which is registered and stored for each of a plurality of users in advance, or the type of operation and a word "interrupt"; and
a command outputting processing that, at least when the determining processing determines that the decoded voice describes a type of operation registered in advance, outputs a command for allowing a processing involved in the type of operation to be executed, the command outputting processing being configured; when the determining processing determines that the decoded voice describes a type of operation registered in advance and a word "interrupt" while the processing involved in the type of operation is executed, to output a command for suspending the processing which is being in execution and allowing a processing involved in the type of operation specified with the "interrupt" to be executed as a priority; and output a command for allowing the suspended processing to be resumed after the processing specified with the "interrupt" is completed.

9. An electronic apparatus comprising:
a voice inputting unit for inputting the user's voice;
a storing unit that stores at least a predetermined type of operation and an authorized status for each of a plurality of users;
a recognizing unit that recognizes the user based on voice information input through the voice inputting unit;
a voice decoding unit that decodes the voice information when the user is recognized by the recognizing unit;
a determining unit that determines if the information decoded by the voice decoding unit describes a type of operation in the storing unit or not, and also determining if the user is authorized to perform the type of operation when the determining unit determines the information describes the type of operation in the storing unit; and
a command outputting unit that outputs a command for the type of operation, when the determining unit determines that the user is authorized to perform the type of operation.

10. The electronic apparatus according to claim 9, wherein the type of operation includes at least one selected from the group consisting of copy operation, facsimile transmission operation and Email sending operation, and
the storing unit stores setting information of a copy density and a number of sets to print when the type of operation is the copy operation, and stores setting information of destinations when the type of operation is the facsimile transmission operation and the Email sending operation.

11. The electronic apparatus according to claim 10, wherein the storing unit has a user table and a base table,
the information of the destinations for facsimile transmission operation and Email sending operation is stored in the base table, and
destination names which individually correspond to the destinations in the base table are stored in the user table with an individual number in the order of setting, for each of the users.

12. The electronic apparatus according to claim 11, wherein,
when the voice decoding unit decodes the voice information of a setting number of a destination name which is stored in the user table and the determining unit determines that the user is authorized to perform the operation, the command outputting unit outputs a command for allowing the facsimile transmission operation or the Email sending operation to be executed to a destination corresponding to the setting number.

13. The electronic apparatus according to claim 10, further comprising:
a displaying unit that displays the setting information, and
a display controlling unit that controls a display on the displaying unit,
wherein the command outputting unit outputs a command to the display controlling unit to display the setting information on the displaying unit, when the determining unit determines that the user is authorized to perform the type of operation.

14. The electronic apparatus according to claim 13, wherein the command outputting unit outputs a command to the display controlling unit to display the destination names stored in the user table on the displaying unit in the order of setting when the determining unit determines that the user is authorized to perform the type of operation.

15. A computer readable medium on which a voice operating program is recorded, the voice operating program configured to cause an electronic apparatus to execute processings comprising:
a recognizing processing that recognizes a user based on the information of the voice which is input through the voice inputting unit;
a voice decoding processing that decodes the voice information, when the user is recognized in a recognizing processing;
a determining processing that determines if the information decoded in the voice decoding processing describes a type of operation, with reference to a storing unit which stores at least a predetermined type of operation and an authorized status for each of a plurality of user, and also determining if the user is authorized to perform the type of operation, with reference to the storing unit, when the information is determined that the information describes the type of operation; and
a command outputting processing that outputs a command for the type of operation, when the determining processing determines that the user is authorized to perform the type of operation.

* * * * *